United States Patent
Vivirito et al.

(10) Patent No.: US 6,591,157 B1
(45) Date of Patent: Jul. 8, 2003

(54) METHOD AND APPARATUS FOR NOTIFYING MACHINE OPERATORS OF THE NECESSITY FOR PREVENTIVE MAINTENANCE

(75) Inventors: Joseph R. Vivirito, South Windsor, CT (US); John H. Gates, Manchester, CT (US); Richard Kuchta, Shickshinny, PA (US)

(73) Assignee: Gerber Technology, Inc., Tolland, CT (US)

( * ) Notice: Subject to any disclaimer, the term of this patent is extended or adjusted under 35 U.S.C. 154(b) by 0 days.

(21) Appl. No.: 09/522,164

(22) Filed: Mar. 9, 2000

(51) Int. Cl.$^7$ ................................. G06F 19/00
(52) U.S. Cl. ..................... 700/175; 700/79; 702/184
(58) Field of Search ..................... 700/174, 79, 80, 700/177, 180, 175, 179, 195; 702/184, 172; 706/911, 912; 409/196; 83/62.1

(56) References Cited

U.S. PATENT DOCUMENTS

| | | | |
|---|---|---|---|
| 2,414,152 A | | 1/1947 | Jackson |
| 3,872,751 A | | 3/1975 | Schmidt |
| 4,031,368 A | * | 6/1977 | Colding et al. ............. 356/447 |
| 4,214,191 A | | 7/1980 | Watanabe et al. |
| 4,472,990 A | | 9/1984 | Seragnoli et al. |
| 4,503,866 A | | 3/1985 | Boult et al. |
| 4,531,436 A | | 7/1985 | Antonissen |
| 4,643,061 A | | 2/1987 | Gerber |
| 4,674,374 A | | 6/1987 | Sadahiro et al. |
| 4,771,665 A | | 9/1988 | Van Doorn et al. |
| 4,991,476 A | | 2/1991 | Chow et al. |
| 5,090,281 A | | 2/1992 | Paulson et al. |
| 5,303,515 A | | 4/1994 | Etcheparre et al. |
| 5,573,442 A | | 11/1996 | Morita et al. |
| 5,626,065 A | | 5/1997 | Cattini |
| 5,877,961 A | * | 3/1999 | Moore ........................ 345/835 |
| 6,138,056 A | * | 10/2000 | Hardesty et al. .............. 408/11 |
| 6,445,969 B1 | * | 9/2002 | Kenney et al. ............ 29/33 M |

* cited by examiner

*Primary Examiner*—Leo Picard
*Assistant Examiner*—Kidest Bahta
(74) *Attorney, Agent, or Firm*—McCormick, Paulding & Huber LLP

(57) ABSTRACT

In an apparatus for notifying machine operators of the necessity for preventive maintenance, predetermined difficulty factors corresponding to the severity of particular machine operating conditions are stored in the memory of a controller. Maximum acceptable values are also stored in the controller's memory. Sensors, detect any one of a number of different machine operating parameters and the duration for which the machine functions under a particular operating condition. These parameters are quantified with respect to one of the difficulty factors most closely related to the operating condition. The quantified parameters are accumulated and compared with the appropriate maximum value. When the accumulated quantified parameters reach the maximum value, an operator is alerted to the fact that maintenance is needed.

7 Claims, 1 Drawing Sheet

METHOD AND APPARATUS FOR NOTIFYING MACHINE OPERATORS OF THE NECESSITY FOR PREVENTIVE MAINTENANCE

FIELD OF THE INVENTION

The present invention generally pertains to automated machinery, such as machines for cutting cloth and other sheet-type work materials, and is more particularly directed to a system for monitoring various operating parameters and providing a means for alerting an operator when preventive maintenance is required.

BACKGROUND OF THE INVENTION

The present invention can be used with several different types of machine but has particular utility when used with machinery for performing cutting operations on a single ply or one or more layers of sheet-type work material stacked one-on-top-of-the-other. Accordingly, the present invention will be described herein as being directed to such use, however it should be noted that the present invention, in its broader aspects is not limited in this regard.

All machinery requires periodic preventive maintenance, however, the intervals between maintenance activities vary depending on the type and severity of the use to which the particular machine is subjected. Machinery for performing cutting operations on one or more layers of sheet-type work material, typically include a cutting head that carries a high speed reciprocating cutting blade. Generally the blade, and the mechanism for driving the blade are subjected to heavy loads.

The severity of these loads can vary, and as such, the frequency of scheduled preventive maintenance, e.g. lubrication of bearings, and sharpening of the blades should also vary accordingly. A difficulty that often occurs is that these machines do not include any system for alerting an operator to the necessity for preventive maintenance. Therefore, a periodic maintenance schedule is usually implemented wherein the maintenance operations are executed at predetermined regular intervals. The difficulty associated with this type of maintenance schedule is that no consideration is given to the severity, or lack thereof, of the conditions under which the machine is operating. Accordingly, maintenance operations are often performed before they are needed, unnecessarily taking the machine out of service and disrupting production schedules. Alternatively, the scheduled maintenance periods could be too infrequent, resulting in damage to the machine.

Based on the foregoing, it is the general object of the present invention to provide a means for determining when preventive maintenance on a machine is required, that overcomes the drawbacks of prior art methods for determining maintenance schedules.

It is a more specific object of the present invention to provide an apparatus for monitoring various machine operating parameters, comparing these parameters with stored data pertaining to machine wear, and alerting an operator when maintenance is required.

SUMMARY OF THE INVENTION

The present invention is directed to an apparatus for notifying machine operators of the necessity for preventive maintenance that includes means for inputting and storing difficulty factors corresponding to a level of machine, or component use at which preventive maintenance is required. Means are also provided for measuring various different machine operating parameters and for quantifying the measured operating parameters and proportionally adjusting the quantified operating parameters in comparison with the stored difficulty factors related to the severity of the machine operating conditions.

Once the proportionally adjusted operating parameters are established, they are accumulated via a summation means to determine the total accumulated machine usage since the last maintenance was performed on the machine. Once the total accumulated usage has been determined, means for comparing this data to the data corresponding to a maximum level or value of machine, or component use at which preventive maintenance is required are employed. When the means for comparing indicates that preventive maintenance is required, an indicator is energized to alert the operator. The indicator can also be set to alert the operator at a predetermined interval prior to the necessity for preventive maintenance, thereby allowing for a planned shutdown of the particular machine.

Preferably, the above-described apparatus will be used in conjunction with an apparatus for cutting pattern pieces from one or more layers of sheet-type work material having a cutter head and a reciprocating cutting blade. In this situation, the rate of reciprocation, the load on the motor, or some other operating parameter would be monitored by the measuring means and then proportionally adjusted by applying the appropriate difficulty factor corresponding to the severity of the use to which the machine is subjected. The indicator would then be energized once a predetermined accumulated usage level has been reached.

The present invention also resides in a method for notifying machine operators of the necessity for preventive maintenance wherein a sheet material cutting machine is provided that includes a movable cutter head for carrying a blade reciprocatingly mounted thereto and driven by a motor. A controller is associated with the sheet material cutting machine and has predetermined difficulty factors corresponding to the severity of cutting operations stored therein. In addition maximum values at which maintenance should be performed on the cutting machine are also stored in the controller.

During operation, it is preferable that the load on the motor and the duration of each use of the machine be measured. A difficulty factor is then assigned to each cutting operation performed by the cutting machine which quantifies the severity of the particular cutting operation. Next, the difficulty factor and the duration of each use are multiplied together to arrive at a product.

The products of each cutting machine use are then summed together to determine a total summed value which is then compared to the appropriate maximum value. Once the maximum value is reached, a warning preferably in the form of an indicator light is energized providing the machine operator with an indication for the need for maintenance to be performed on the machine.

DETAILED DESCRIPTION OF THE PREFERRED EMBODIMENT

Figure 1:
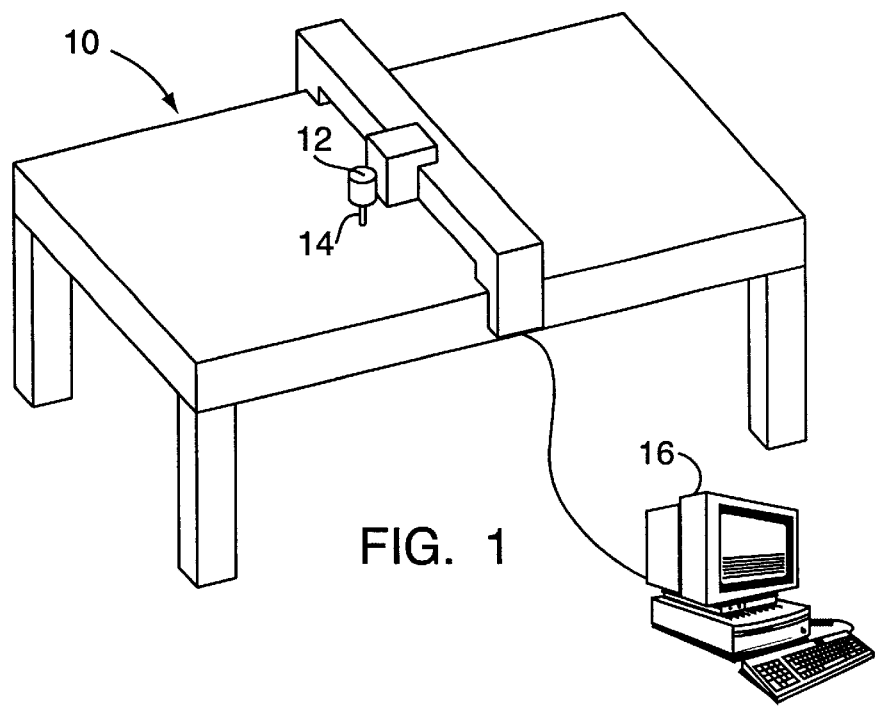
FIG. 1 is a perspective view of an apparatus for notifying machine operators of the necessity for preventive maintenance.

An apparatus embodying the present invention is shown being used in connection with a sheet-type work material cutting machine generally designated by the reference number 10. The cutting machine 10 includes a cutter head 12 mounted to the machine for movement in both a longitudinal and transverse direction thereof. A blade 14 is reciprocatingly coupled to the cutter head 12 and is driven at a predetermined rate of rotation by a suitable drive, such as an electric motor (not shown) in response to commands issued from a controller 16. In operation, the blade 14 cuts pattern pieces from one or more layers of sheettype work material stacked one-on-top-of-the-other.

In order to appropriately assess the degree and severity of use to which the machine 10 and its components, namely, the blade 14 and its drive mechanism are subjected the actual use of the machine in terms of time, load on the motor, strokes of the blade, or other parameters, is measured. Depending on the severity of a particular machine use, a "difficulty factor" is assigned to the use, and the measured data is weighted or quantified according to this difficulty factor. For example, cutting through several plies of fabric requires that the blade and therefore the motor and bearings supporting the blade rotate at higher RPM's, than if a single ply was cut through. Accordingly, the difficulty factors corresponding to the severity of each use would be quite different. For example, higher machine idle times and light operating loads would allow for increased time between bearing lubrications than if heavier loads and less idle were encountered.

The cutting machine 10 should only be operated for a predetermined period of time for a given difficulty factor before maintenance is performed on the machine. Where the machine is operated under several different operating conditions, a different difficulty factor is assigned to each condition. Accordingly, it is the summation of the products of the difficulty factors multiplied by the time during which cutting machine 10 operated, for each condition that determines when preventive maintenance is necessary. This summation yields a total summed value which should not exceed a predetermined stored maximum value. As this maximum value is approached the machine operator should be alerted to the need for maintenance.

Figure 2:
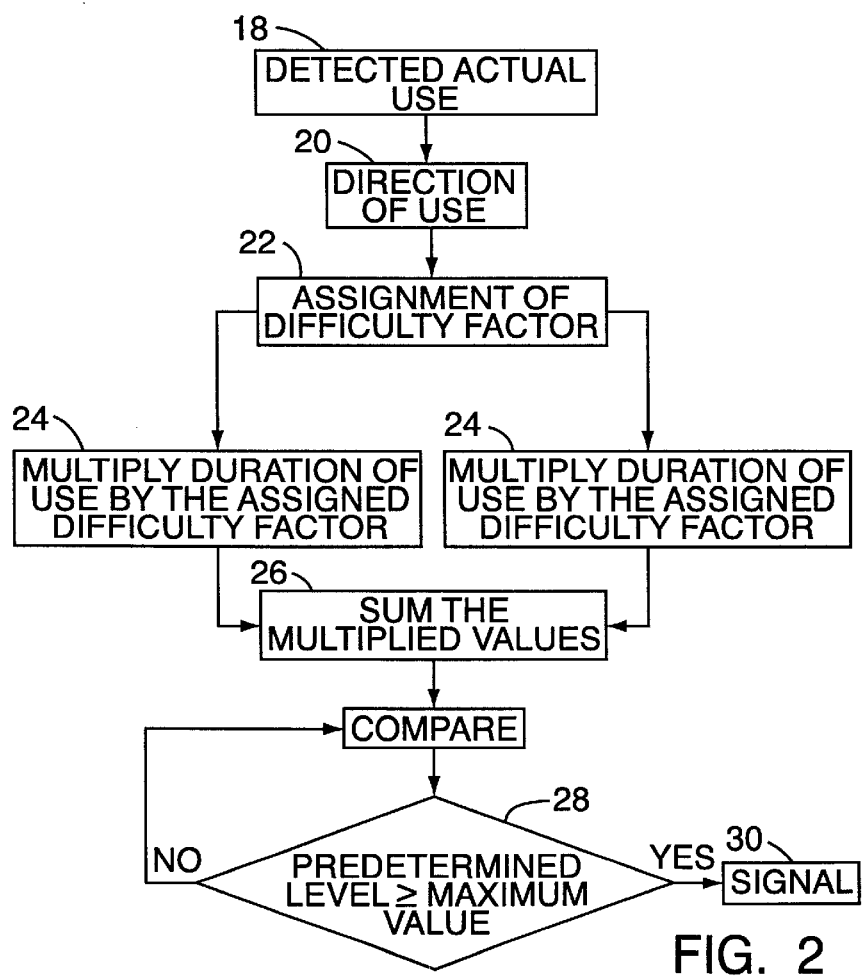
FIG. 2 is a simplified schematic of the control logic for operating the apparatus of FIG. 1.

Referring to FIGS. 1 and 2, operation of the cutting machine 10 is continuously monitored by sensors (not shown) mounted in the cutter head 12 which detects the extent of the actual usage of the cutting machine as indicated by box 18, FIG. 2. The sensors generate and transmit signals to the controller 16 corresponding to the monitored operating parameters. The operating parameter that is most preferably monitored by the sensors is the load, or power being drawn by the electric motor. By measuring this parameter, there is no need to differentiate between the number of plies, or the particular material being cut. Based on signals sent to the controller by the sensors, corresponding to the rate of reciprocation of the blade 14, a difficulty factor is assigned by the controller 16, to the particular operation being performed. While the measured parameter has been described as being the rate of reciprocation of the blade 14, the present invention is not limited in this regard as other parameters, such as, but not limited to the load on the motor, or ambient temperature can also be monitored without departing from the broader aspects of the present invention.

The duration of the particular operation is also monitored by the controller 16, box 20, FIG. 2. As indicated by box 22, FIG. 2, the previously determined difficulty factor and the duration of operation are multiplied together for each use of the cutting machine 10. The products of the difficulty factor and the duration for each use are then accumulated and summed together by the controller 16 to yield a total summed value, box 24, FIG. 2.

As shown in box 26 of FIG. 2, the total summed value is then compared to a database of maximum values stored in the controller 16. When the total summed value approaches the stored maximum value a signal is generated, box 28, FIG. 2, by the controller 16, to illuminate an indicator light 30, alerting the machine operator that maintenance needs to be performed on the cutting machine 10. If desired, the system may be programmed to provide a first alert at some predetermined point in advance of the maintenance requirement, and a second alert, when maintenance is actually due. After the specified maintenance, such as bearing lubrication, has been performed, the total summed value is reset to zero in anticipation of the next maintenance interval.

While preferred embodiments have been shown and described, various modifications and substitutions may be made without departing from the spirit and scope of the present invention. Accordingly, it is to be understood that the present invention has been described by way of example, and not by limitation.

What is claimed is:

1. An apparatus for notifying machine operators of the necessity for preventive maintenance comprising:

memory means for storing predetermined difficulty factors corresponding to the severity of particular machine operating conditions, said memory means also for storing maximum values at which maintenance should be performed on said machine;

measurement means for sensing said machine operating conditions and the duration for which said machine functions under said operating conditions;

adjustment means for quantifying said sensed operating condition for each machine use with respect to one of said difficulty factors most closely related to said operating condition;

summation means for accumulating the quantified sensed operating conditions for a number of machine uses;

comparison means for equating the quantified sensed operating conditions as accumulated by said summation means, to one of said stored maximum values most closely related to said sensed operating conditions; and an indicator for alerting an operator when said maximum value is attained.

2. An apparatus for notifying machine operators of the necessity for preventive maintenance as defined by claim 1, wherein:

said machine includes a cutter head having a blade coupled for reciprocation thereto; and said measurement means detects the rate of reciprocation of said blade.

3. An apparatus for notifying machine operators of the necessity for preventive maintenance as defined by claim 1, wherein:

said machine includes a cutter head having a reciprocating blade driven by an electric motor; and said measurement means includes at least one sensor coupled to said cutter head for detecting the load on said motor during a cutting operation.

4. An apparatus for notifying machine operators of the necessity for preventive maintenance as defined by claim 1, wherein:

said indicator alerts the operator at a predetermined interval before said maximum value is reached.

5. A method for notifying machine operators of the necessity for preventive maintenance, comprising the steps of:

providing a sheet material cutting machine that includes a movable cutter head for carrying a blade reciprocatingly mounted thereto and driven by a motor;

providing a controller associated with said sheet material cutting machine, said controller having predetermined difficulty factors corresponding to the severity of a cutting operation, and maximum values at which maintenance should be performed, stored therein;

operating said cutting machine to perform a cutting operation on one or more layers of sheet-type work material;

measuring a characteristic of a component of said cutting machine;

assigning a difficulty factor to said cutting operation most closely related to the severity of the operating conditions under which the cutting machine is functioning as indicated by the characteristic;

quantifying the severity and the duration of each use of said cutting machine with respect to a difficulty factor most closely related to the severity of each use;

accumulating the products for a number of said cutting machine uses to determine a total accumulated value;

comparing said total accumulated value to said maximum value; and warning the cutting machine operator when said maximum value is reached.

6. A method for notifying machine operators of the necessity for preventive maintenance as defined by claim 5, further comprising the step of warning the operator of said cutting machine at a predetermined point prior to reaching said maximum value.

7. A method for notifying machine operators of the necessity for preventive maintenance as defined by claim 5, further comprising the step of resetting the total summed value to zero after a maintenance operation has been performed performed on the machine.

* * * * *